United States Patent Office 2,834,098
Patented May 13, 1958

2,834,098

METAL ARC WELDING OF 90-10 TYPE COPPER-NICKEL MATERIAL

George Raymond Pease, Westfield, and Theodore Ephraim Kihlgren, Berkeley Heights, N. J., assignors to The International Nickel Company, Inc., New York, N. Y., a corporation of Delaware No Drawing. Original application November 6, 1953, Serial No. 390,732, now Patent No. 2,745,771, dated May 15, 1956. Divided and this application November 3, 1955, Serial No. 544,822

5 Claims. (Cl. 29—194)

The present invention relates to the arc welding of metal and, especially, to a flux-coated electrode and an arc-welding method for producing sound, strong and ductile weld deposits and, more particularly, to a flux-coated copper-nickel arc-welding electrode adapted for producing substantially pore-free, sound, strong and ductile weld deposits on iron-bearing copper-nickel material and also to the resultant weld deposit and welded product.

Copper-nickel alloy of the 90(copper)-10(nickel) type containing about 5–15% nickel and approximately 1–1.5% iron is a relatively new material. The prior art relative to joining this material is therefore very limited. While attempts have been made to weld this material using a 70% copper-30% nickel alloy, no electrode having a core wire of substantially matched composition has been available for satisfactorily welding the aforementioned iron-bearing 90-10 type copper-nickel alloy. The recent critical shortage of nickel served to focus attention on this new alloy as a substitute for 70/30 copper-nickel in the shipbuilding industry. This prompted efforts to produce a flux-coated electrode having a core wire of a composition similar to or matching that of the iron-bearing 90-10 type copper-nickel material to be poined. However, prior to applicants' invention it has not been possible to apply known fluxes to such a core wire and to consistently produce satisfactory welds. The arc has been inclined to be bubbly and the slag removal somewhat difficult. Extreme care has been required to avoid undercutting in a deep V. Excessive porosity also has been encountered. Furthermore, such welds have not possessed strength properties of the desired magnitude. Although many attempts were made to overcome the foregoing difficulties and other difficulties, none, as far as we are aware, was entirely successful when carried into practice commercially on an industrial scale.

It has now been discovered that by the use of applicants' novel combination of a particular flux coating with an appropriately alloyed 90-10 type copper-nickel core wire, welds are readily obtained in an arc-welding process that are virtually porosity-free and that have attractive strength properties and good ductility.

It is an object of the invention to provide a 90-10 type cupro-nickel weld deposit which is sound, strong and ductile and substantially free from porosity.

The invention further contemplates providing an article of manufacture having a welded joint in 90-10 type cupro-nickel material with the weld metal also of a 90-10 type cupro-nickel composition, the weld being sound, strong and ductile and substanially free from porosity.

It is a further object of the invention to provide a 90-10 type copper-nickel welded joint substantially devoid of hot cracking.

It is another object of the invention to provide a 90-10 type copper-nickel weld deposit substantially devoid of hot cracking.

It is also an object of the invention to provide a 90-10 type copper-nickel welded joint, the weld being sound, strong and ductile, substantially free from porosity and substantially devoid of hot cracking.

Other objects and advantages of the invention will become apparent from the following description.

Generally speaking, the present invention contemplates a novel electrode comprising a particular flux coating on a copper-nickel alloy core wire especially adapted for the electric-arc welding of copper-nickel alloys. According to the present invention, there is a delicate balance of the constituents of the flux coating in relation to the core wire to produce an arc-welding electrode having good arc behavior and slag characteristics producing a good weld contour and a high quality deposit. The electrode provided by the present invention is intended for use particularly with direct current. This electrode deposits radiographically-sound metal and is readily operable in flat and vertical positions and can be used in the overhead position in appropriate diameters.

The flux coating of the electrode provided by the present invention is given in Table 1.

TABLE 1

*Flux composition*

| Ingredients | Parts by Weight | | |
|---|---|---|---|
| | Broad Range | Preferred Range | Preferred Example |
| Dry Flux: | | | |
| Calcium Carbonate | 6 to 26 | 10 to 20 | 16 |
| Calcium Fluoride | 15 to 30 | 22 to 30 | 25 |
| Cryolite | 15 to 30 | 20 to 25 | 24 |
| Titania | 20 to 30 | 22 to 28 | 24 |
| Manganese | 1.7 to 8.5 | 1.7 to 4.3 | 2.6 |
| Silicon | up to 1.3 | | |
| Calcium Silicate [1] | 2 to 10 | 4 to 8 | 5 |
| Bentonite | 2 to 5 | 2 to 4 | 3 |

[1] Calcium silicate may be used in any appropriate form, such as Wollastonite. An equal quantity of anhydrous sodium silicate may be substituted for the calcium silicate if desired, with some attendant loss of extrudability.

The binder to be used in the flux composition is to be of a suitable water dispersible type. For example, a satisfactory binder can have the following composition:

| Ingredients | Percent of Weight of Dry Flux | |
|---|---|---|
| | Range [1] | Pref. Example |
| Sodium Silicate Solution (42° Baumé) | 10 to 20 | 15 |
| Invert Sugar Solution (43° Baumé) (preferably "Mordex") | 1 to 3 | 2 |

[1] (For both broad and preferred ranges of flux.)

In preparing the flux coating from the foregoing dry ingredients and binder, the binder is added to the mixture of dry ingredients, together with additional water as needed, to obtain a consistency suitable for extrusion with the core wire. Although it is preferred to use Mordex as the invert sugar solution in the binder, other types of invert sugar solutions may be used. Furthermore, sodium silicate solutions and invert sugar solutions of different specific gravity from those specified in the foregoing binder also may be used. A solution containing an equivalent amount of potassium silicate may be substituted for the sodium silicate solution in the binder.

The manganese and the silicon may be incorporated in the flux composition in any suitable form. Preferably, the manganese is added as ferro-85 manganese and the silicon is added as nickel-50 silicon. However, other ferro-manganese alloys and nickel-silicon alloys may be used.

Calcium carbonate, calcium silicate, calcium fluoride, cryolite and titania in the flux are all nominal slag-forming agents. The calcium carbonate and titania are also arc stabilizers. The arc can be expected to lose stability materially if the flux contains less than the minimum amounts of calcium carbonate and titania set forth in Table 1. When the cryolite is used in amounts less than about 15% in combination with the other ingredients of the flux in the ranges set forth in Table 1, the weld quality and all-position operability are adversely affected. Calcium silicate in combination with the other ingredients in the flux provides an additional increment of arc stability and likewise provides a marked improvement in electrode operability in the vertical position, which improvement is not evident without the presence of the calcium silicate. Nickel-50 silicon may be included in the coating up to 2.5%, as an added optional source of silicon, to improve the strength properties of the weld without damaging arc characteristics. Higher amounts will progressively detract from operability. Manganese when included with the other ingredients in the flux enhances arcing characteristics. In the absence of bentonite, extrudability of the flux would be reduced, thereby adversely affecting the manufacture of the coated weld rod.

Applicants' special core wire for the electrode of the present invention is a copper-base alloy containing, as the essential ingredients, copper, nickel, iron, manganese and silicon. The aforementioned essential ingredients are co-present in the core wire in controlled and critical amounts. The broad and preferred ranges of the ingredients of the core wire of the present invention together with a preferred example thereof are given in Table 2. The broad range, the preferred range and the preferred example of the core wire are used with the broad range, the preferred range and the preferred example, respectively, of the flux composition of Table 1.

TABLE 2

Core wire composition

| Elements | Percent by Weight | | |
| --- | --- | --- | --- |
| | Broad Range | Preferred Range | Preferred Example |
| Nickel | 5 to 15 | 9 to 11 | 10 |
| Iron | 0.5 to 2 | 1 to 1.6 | 1.5 |
| Manganese | 0.05 to 1 | 0.15 to 0.5 | 0.4 |
| Silicon | 0.2 to 1 | 0.2 to 0.5 | 0.4 |
| Magnesium | 0.08 max. | 0.05 max. | |

The balance of the core wire composition in Table 2 is copper, but small amounts of other elements as noted hereinafter may be present in the balance with the copper. The copper content of the core wire composition is about 80.4% to 94.3% in the broad range, about 85.8% to 89.7% in the preferred range, and about 87.5% in the preferred example.

It is to be understood that in commercial practice very small amounts of other elements may be included in the copper balance of the core wire compositions described above. For example, sulfur and lead are impurities and they are desirably kept low. Other so-called tramp elements, such as phosphorus, selenium, bismuth, must be absent or kept low. The total amount of any other metals (zinc, cobalt, etc.) should be not more than about 0.50%.

A minimum of about 0.2% silicon in the core wire seems to eliminate most of the weld porosity and has a strengthening effect on the weld metal and also improves the soundness of the weld as compared with an electrode having silicon in the coating only. About 0.4% silicon in the core wire appears to be optimum. Furthermore, the silicon in the core wire eliminates porosity without impairing electrode operability.

It has been found that lead and silicon act synergistically to produce hot cracking in 90-10 type copper-nickel welds. As a result of tests, applicants have established that if the 0.05% maximum lead contamination level that is now recognized in base metal specifications must, for manufacturing reasons, be carried into filler metal specifications, not more than about 0.15% silicon can safely be present in the 90-10 type copper-nickel weld metal. If the lead contamination in the weld metal can be held to 0.02% maximum, the permissible silicon content in the weld metal can be doubled with modest improvement in strength properties due to the presence of the additional silicon. At 0.01% lead in the weld, the silicon in the weld can be up to about 0.35%, thus permitting complete utilization of the weld strengthening effect imparted by silicon. It has been discovered that a definite lead-silicon relationship exists in which the maximum permissible amount of lead contamination in the weld may be expressed by the equation Maximum percent Pb in weld = $0.08 - 0.2 \times$ percent Si in weld Magnesium, although not normally necessary, should be added where melting conditions and production of the core wire point to a possibility of sulfur contamination. Magnesium in combination with the aforementioned essential ingredients also improves hot malleability and hot working operations. The magnesium may be included for the aforementioned purposes in small amounts up to about 0.08%, preferably in small amounts up to about 0.05%.

The alloy can be prepared, and the core wire can be made therefrom, by any conventional alloying and manufacturing procedures such as are well known in the art. The flux coating can likewise be made, and the core wire coated therewith, by any conventional manufacturing procedures such as are well known in the art. However, on completion of the low temperature drying treatment of the coated core wire, a "bake" at about 550° F. for about two hours is applied.

The combinations of core wire diameters and electrode outside diameters set forth in Table 3 have been found satisfactory.

TABLE 3

| Core Wire diameter, inches | Coated Electrode Outside Diameter, inches |
| --- | --- |
| 3/16 | 0.240 |
| 5/32 | 0.210 |
| 1/8 | 0.190 |
| 3/32 | 0.140 |
| 5/64 | 0.120 |

For the purpose of giving those skilled in the art a better understanding of the invention and a better appreciation of the advantages of the invention, the following illustrative data are given:

I.—RESISTANCE TO WELD HOT CRACKING

Metal deposited by the preferred electrode example (the preferred example of the core wire together with the preferred example of the flux coating thereon as set forth in Tables 1 and 2) has satisfactorily passed the X-weld crack test. In making this test, two 3-inch long pieces cut from 1-inch square bar stock are clamped with their edges together to form a double-V groove or X-joint. Then passes are laid in, two at a time, on alternate sides of the joint, allowing the specimen to cool to about 100° F. between passes. The specimen is clamped for the early part of the test and is subsequently left unclamped for the balance of the test. During welding, each pass is examined visually and on completion of welding, two cross sections about 5/8 inch to 3/4 inch from each end are polished and etched and examined for cracks. A complete description of the test, and illustrations of the test specimen, may be found in the Welding Journal, vol. 24, 769-S to 775-S (November 1946). A silicon content in the weld of the order of 0.1% to 0.15% contributes materially to the weld strength, insures freedom from weld unsoundness and at the same time is well below the threshold limit of about 0.35% to 0.4% silicon at which hot cracking will occur even with low lead and sulfur levels. Any increase in the amount of either or both lead and sulfur tends to diminish the hot cracking resistance at all silicon levels. For instance, a deposit made by using an electrode of the preferred example but containing about 0.12% lead and 0.05% silicon was severely cracked in the X-weld crack test. The hazard associated with the presence of lead, particularly, increases as the silicon content of the weld approaches the aforementioned limit of about 0.35% to 0.4%. It is therefore preferred, generally speaking, to use a combination of coating and core wire within the preferred ranges of Tables 1 and 2 which will insure weld metal silicon contents of the order of 0.1% to 0.15%. Under conditions of severe restraint, such as in the X-weld crack test, the threshold limit for lead with silicon in the desired range is determined by the relationship expressed in the equation Maximum percent Pb in weld =
$$0.08 - 0.2 \times \text{percent Si in weld}$$

Sulfur may be of the order of 0.02% to 0.05%. However, the permissible sulfur content is dependent upon the magnesium content of the weld and is preferably held to 0.02% maximum. High magnesium contents in the weld metal will permit more sulfur to be present than low magnesium contents, but magnesium recoveries are very poor in metal arc welds.

The bar stock used in making the aforementioned weld hot cracking tests had the following approximate composition:

| | Percent |
|---|---|
| Copper | 88 |
| Nickel | 10.1 |
| Iron | 1.4 |
| Manganese | 0.4 |
| Silicon | 0.006 |

II.—PROPERTIES AND COMPOSITION OF REPRESENTATIVE WELDS

Butt welds were made on ⅜" iron-bearing 90-10 type copper-nickel plate of the same composition as the bar stock used in the aforementioned weld hot cracking tests and using the preferred electrode example (a preferred example of the core wire together with the preferred example of the flux coating thereon as set forth in Tables 1 and 2) but containing different amounts of silicon in the core wire as set forth in Table 4. Transverse tensile test specimens were cut from the butt joints in the ⅜" welded plate. These specimens were tested to determine the tensile strength and the yield strength of the welded material. In addition, transverse bend test specimens were also cut from the butt joint in the ⅜" welded plate. These transverse bend test specimens were bent in a jig to a U shape with the weld face in tension. Upon removal from the jig the convex surface was examined for the appearance of cracks or other open defects. The results of this test are reported in the column headed "180° guided U-bend test." After completion of the guided bend test the bend specimens were then flattened to failure as free bend specimens and elongation was measured across the weld. A complete description of these bend tests and illustrations of the test specimens may be found in the American Welding Society publication "Welding Handbook," 3rd edition, 1950, pages 1450 to 1459, inclusive. The results of the foregoing tests are given in Table 4.

TABLE 4

*Transverse bend test*

[Butt joint, ⅜" plate]

| Weld No. | Weld Position | Si Content of Core, percent | Si in Weld, percent | 180° Guided U-bend test | Free bend test (percent elong.) | Weld Hardness (Rock. B) |
|---|---|---|---|---|---|---|
| A-2: | | | | | | |
| Face | Flat | 0.43 | 0.098 | Satisfactory | 56 | 39-50 |
| Do | do | | | do | 62 | |
| Root | do | | | do | 35 | |
| A-3: | | | | | | |
| Face | Vertical | 0.43 | 0.1 | do | 59 | 37-52 |
| Do | do | | | do | 60 | |
| Root | do | | | do | 62 | |

*Transverse tensile test*

[Butt joint, ⅜" plate]

| Weld No. | Weld Position | Yield Strength, p. s. i. | | Tensile Strength, p. s. i. |
|---|---|---|---|---|
| | | .2% Offset | .5% ext. under load | |
| A-2 | Flat | 27,000 | 29,000 | 45,400 |
| | do | 22,800 | 24,600 | 44,900 |
| A-3 | Vertical | 23,100 | 24,900 | 45,000 |
| | do | 21,900 | 23,900 | 45,100 |

*Representative all weld-metal analyses*

[⅛" diam. Electrode]

| Elements | Percent by Weight | | | |
|---|---|---|---|---|
| | Wire No. A | Weld Metal | Wire No. B | Weld Metal |
| Nickel | 10.07 | 10.04 | 10.27 | 10.4 |
| Iron | 1.53 | 1.73 | 1.54 | 1.74 |
| Manganese | 0.49 | 0.87 | 0.49 | 0.64 |
| Silicon | 0.43 | 0.1 | 0.23 | 0.04 |
| Copper | Balance[1] | Balance[1] | Balance[1] | Balance[1] |

[1] Including small amounts of other incidental elements and impurities which may be present in commercial practice as mentioned in regard to Tables 2 and 5.

III.—COMPOSITION OF WELD DEPOSIT

The composition of an all-weld metal deposit will vary with the electrode diameter, because of the variable ratio of coating weight to core wire weight, and with the core wire composition within the ranges set forth in Table 2.

Using the core wires of Table 2, the following variation in the composition of the copper-base weld metal deposit can be expected, allowing for the aforementioned variables:

TABLE 5

Weld metal composition

| Elements | Percent by Weight | |
|---|---|---|
| | Broad Range Corresponding to Broad Range of Core Wire | Preferred Range Corresponding to Preferred Range of Core Wire |
| Nickel | 5 to 15 | 9 to 11 |
| Iron | 0.5 to 2.5 | 1 to 2.2 |
| Manganese | 0.4 to 1.75 | 0.5 to 1.25 |
| Silicon | 0.03 to 0.4 | 0.1 to 0.15 |

The balance of the weld metal composition of Table 5 is copper, except for small amounts of other incidental elements which may be present in the balance with the copper in commercial practice due to their presence in the electrode, i. e., in the core wire and/or in the flux coating, as mentioned herein. The aforementioned copper content of the weld metal composition is about 79.5% to 94% in the broad range and about 84.5% to 89.4% in the preferred range.

IV.—EFFECT OF SILICON IN THE WELD

Butt joints were prepared in ⅜-inch thick iron-bearing 90–10 type copper-nickel plate (of the same composition as the stock material used in the foregoing weld-crack tests) using electrodes so formulated as to provide the indicated weld metal silicon contents. Transverse tensile test and bend test specimens were cut from the butt joints in the ⅜″ welded plate. These specimens were tested to determine the tensile strength and the elongation in bend of the welded material in accordance with the procedure outlined in section II. X-ray tests were also made to determine the weld quality. The results of the foregoing tests are given in Table 6.

TABLE 6

| Percent Silicon in Weld | Tensile Strength, p. s. i. | Percent Elongation in Bend | Weld Quality (X-Ray) |
|---|---|---|---|
| nil | 42,100 | 50 | scattered porosity. |
| 0.07 | 43,300 | 56 n. f.[1] | very slight porosity. |
| 0.23 | 48,900 | 48 | Do. |

[1] N. f.=no failure.

It is to be observed in this table that as the weld metal silicon content increases the strength properties are materially increased and weld porosity is materially decreased.

V.—DUCTILITY OF RE-HEATED METAL ARC WELDS

An additional series of tests serves to indicate that there is good ductility in the welds even after deliberate exposure of welded joints to temperatures within the iron precipitation range and up to 1650° F. In this series of tests, the results of which are shown in Table 7, a number of ¾-inch wide transverse face bend specimens were prepared from a single weld joint made in ⅜-inch 90–10 type copper-nickel plate (of the same composition as the plate material used in the foregoing section I) with a 5/32-inch electrode having flux and core wire compositions within the broad ranges of Tables 1 and 2, the core wire having 1.7% iron. The free bend tests were made in accordance with the procedure outlined in section II. Weld elongation was measured on each specimen after exposure, in air, to the indicated test temperatures.

TABLE 7

| Condition of Weld | Percent Elongation in Free Bend Test |
|---|---|
| As Welded | 66—No Failure. |
| 2 Hrs.—900° F | 74—No Failure. |
| 2 Hrs.—1,000° F | 67—No Failure. |
| 2 Hrs.—1,100° F | 61—No Failure. |
| 2 Hrs.—1,650° F.—W. Q | 60—No Failure. |

The present invention is of wide application for producing substantially pore-free weld deposits on iron-bearing 90–10 type cupro-nickel alloy material, especially where it is desired to obtain a weld deposit substantially matching the material welded in composition. The present invention is particularly applicable to the shipbuilding industry, for example, for the construction of condensers and piping and for use in other fields where resistance is required to the destructive action of sea water, in particular to the action of rapidly moving sea water.

The present application is a division of applicants' co-pending prior application Serial No. 390,732 filed November 6, 1953, now Patent No. 2,745,771 granted May 15, 1956.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As an article of manufacture, a welded structure comprising at least two members made of a 90–10 type copper-nickel alloy containing 5% to 15% nickel, 1% to 1.5% iron and the balance substantially copper joined together by at least one weld metal deposit composed of an alloy having as the essential elements 84.5% to 89.4% copper, 9% to 11% nickel, 1% to 2.2% iron, 0.5% to 1.25% manganese, and 0.1% to 0.15% silicon with any lead contamination in the resultant weld metal not exceeding the amount being expressed by the equation:

Maximum percent lead in weld=0.08−
0.2×percent silicon in weld

2. As an article of manufacture, a welded structure comprising at least two members made of a 90–10 type copper-nickel alloy containing 5% to 15% nickel, 1% to 1.5% iron and the balance substantially copper joined together by at least one weld metal deposit composed of an alloy having as the essential elements 79.5% to 94% copper, 5% to 15% nickel, 0.5% to 2.5% iron, 0.4% to 1.75% manganese, and 0.03% to 0.4% silicon with any lead contamination in the resultant weld metal not exceeding the amount expressed by the equation:

Maximum percent lead in weld=0.08−
0.2×percent silicon in weld

3. As an article of manufacture, a welded structure comprising at least two members made of a 90–10 type copper-nickel alloy containing 5% to 15% nickel, 1% to 1.5% iron and the balance substantially copper joined together by at least one weld metal deposit composed of an alloy having as the essential elements 84.5% to 89.4% copper, 9% to 11% nickel, 1% to 2.2% iron, 0.5% to 1.25% manganese, and 0.1% to 0.15% silicon.

4. As an article of manufacture, a welded structure comprising at least two members made of a 90–10 type copper-nickel alloy containing 5% to 15% nickel, 1% to 1.5% iron and the balance substantially copper joined together by at least one weld metal deposit composed of an alloy having as the essential elements 5% to 15% nickel, 0.5% to 2.5% iron, 0.4% to 1.75% manganese, and 0.03% to 0.4% silicon, and the balance essentially copper, the copper content being between 79.5% and 94%.

5. As an article of manufacture, a welded structure comprising a member made of a 90–10 type copper-nickel alloy containing 5% to 15% nickel, 1% to 1.5% iron and the balance substantially copper, and having a weld deposit consisting essentially of 5% to 15% nickel, 0.5% to 2.5% iron, about 0.4% to 1.75% manganese, and about 0.03% to 0.4% silicon and the balance essentially copper.

References Cited in the file of this patent

UNITED STATES PATENTS

| | | |
|---|---|---|
| 1,906,567 | Fritshle | May 2, 1933 |
| 2,117,106 | Silliman | May 10, 1938 |